Dec. 16, 1969 G. JERNAKOFF 3,484,589
DIGITAL-ANALOG MULTIPLIER
Filed Oct. 3, 1966
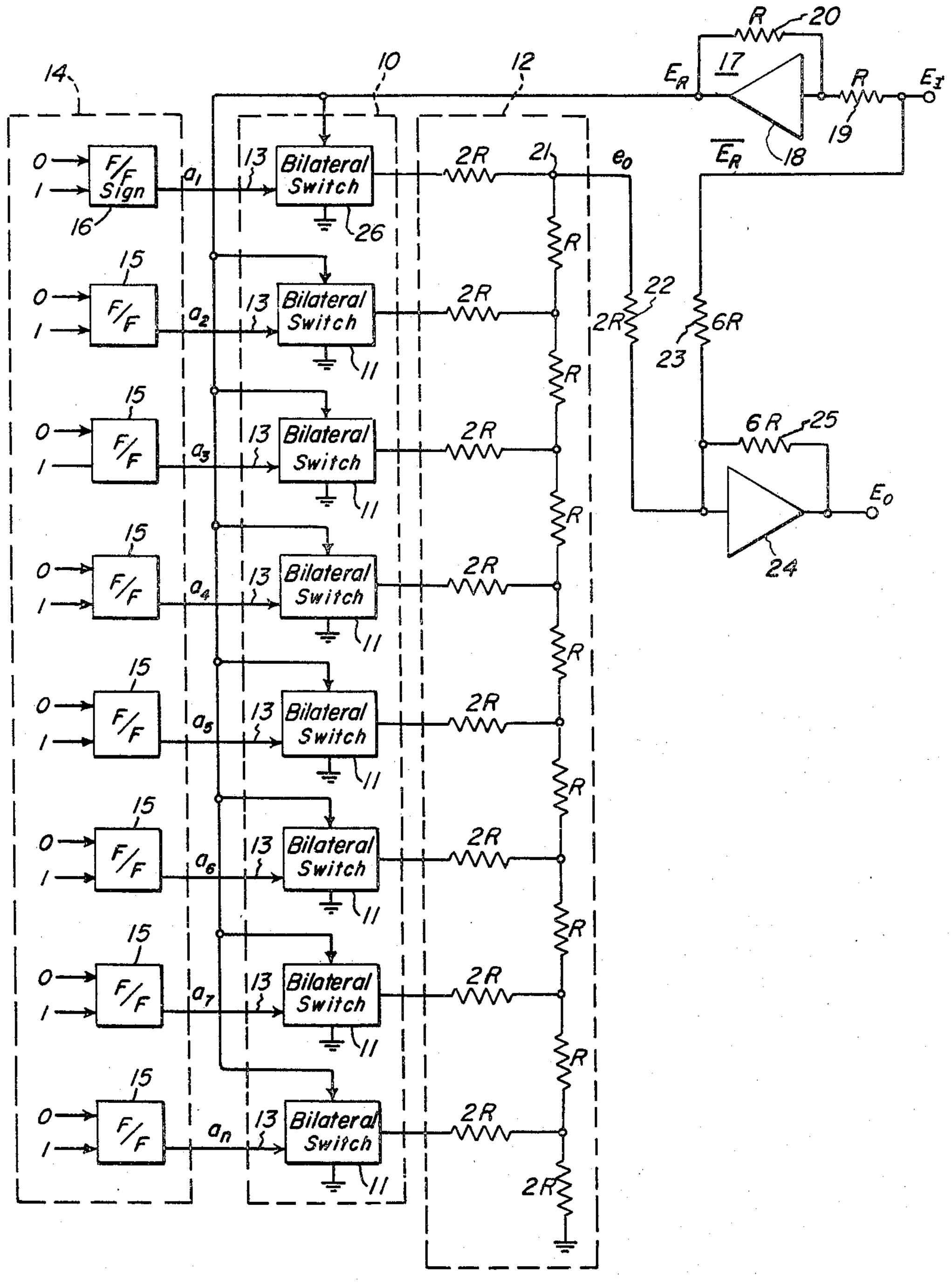
Inventor:
George Jernakoff,
by Marvin Snyder
His Attorney.

United States Patent Office 3,484,589

Patented Dec. 16, 1969

3,484,589

DIGITAL-ANALOG MULTIPLIER

George Jernakoff, Albany, N.Y., assignor to General Electric Company, a corporation of New York Filed Oct. 3, 1966, Ser. No. 583,611
Int. Cl. G06j *1/02;* G06g *7/16*
U.S. Cl. 235—150.52 13 Claims

ABSTRACT OF THE DISCLOSURE

The algebraic product of a number represented by a digital signal, and a number represented by an analog signal, is obtained directly by inverting the analog signal and modulating the inverted analog signal amplitude in accordance with the digital signal and the polarity of the digital signal. The modulated inverted analog signal is then algebraically summed with the analog signal to produce an output signal analog of the desired algebraic product.

This invention relates to apparatus for performing mathematical operations, and more particularly to a four quadrant digital-analog multiplier.

There are many applications wherein algebraic multiplication of two numbers is required. Multipliers for performing this function are commonly known as four quadrant multipliers; that is, multiplication of two negative numbers or two positive numbers produces a positive product, while multiplication of a positive number by a negative number produces a negative product. Heretofore, however, such multipliers could be categorized as either digital or analog multipliers. Thus, in the event it was necessary to perform multiplication of a first number, represented by a digital signal, by a second number, represented by an analog signal one of the signals had to be converted to the same form as the other. The additional inconvenience and cost of performing this conversion has in many cases been prohibitive.

The present invention concerns a method and apparatus for performing, directly, four quadrant multiplication of a number represented by a digital signal, by a number represented by an analog signal, thereby achieving a drastic reduction in complexity of apparatus. The straightforward circuitry of the invention, moreover, permits attainment of results to a high degree of accuracy without commensurate increase in cost.

One of the chief factors inhibiting the advent of direct digital-analog multiplication has been the problem of incorporating the analog signal into a digital-to-analog conversion operation so as to allow multiplication to be accomplished by a simple summation process. The present invention achieves this objective by modulating, prior to a digital-to-analog conversion operation, the amplitude of bits with the analog signal to be multiplied.

Accordingly, one object of this invention is to provide a method and apparatus for performing four quadrant multiplication of a digital signal by an analog signal.

Another object is to provide a simple, straight-forward multiplier circuit capable of performing accurate four quadrant digital-analog multiplication without recourse to extraneous signal conversion operations.

Another object is to provide a four quadrant multiplier for providing immediate and continuous indication of the product of a digital number represented by a digital signal and a number represented by an analog signal.

Another object is to provide a four quadrant digital-analog multiplier capable of performing the multiplication function simultaneous with performance of the interface function between analog and digital computers.

Briefly, in accordance with a preferred embodiment of the invention, a digital signal representing a first number to be multiplied is applied to encoding means for selectively reproducing the bits of said digital signal, or the complements of the bits of said digital signal plus an additional ONE bit. An analog signal representing a number to be multiplied by the first number is jointly applied to an inverter and to summation means. Switching means are utilized to selectively provide circuit paths from the inverter to the summation means in accordance with the output signal of the encoding means. The output signal produced by the summation circuit thereby represents the algebraic product of the digital and analog signals.

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which the single figure is a block diagram of the digital-analog multiplier of the instant invention.

In the figure, switching means 10 including a plurality of bilateral switches 11 is shown coupled to a resistive ladder network 12 comprised of resistances designated R, except for the lowermost grounded resistance designated 2R, and rung resistances designated 2R, in accordance with their relative ohmic values. The uppermost rung terminates at a junction 21. Digital data to be multiplied, preferably in the form of unipolar signals representing a binary number N, are supplied to the control inputs 13 of bilateral switches 11 either directly or, as shown in the drawing, from a register 14 which may include a plurality of bistable circuits such as flip-flop circuits 15. In addition, a SIGN flip-flop circuit 16 furnishes signals, preferably in the form of unipolar signals, to the control input of a bilateral switch 26 of switching means 10. Each of flip-flop circuits 15 and 16 is actuated to its SET condition or RESET condition by application of a signal to its 1 or 0 input respectively. Alternatively, the flip-flop circuits of register 14 may be interconnected in a shaft register configuration to enable serial transfer of digital data into the register.

A second input to each of bilateral switches 11 is provided with a signal $E_R$ from an inverter 17 which receives an analog signal $E_I$ to be multiplied. Inverter 17 includes an operational amplifier 18 with an input resistance 19 and a feedback resistance 20. Although resistances 19 and 20 are shown as being of ohmic value R, those skilled in the art will recognize that, as long as their ohmic values are equal, they may be of any convenient ohmic value unrelated to the ohmic values of the resistances in network 12. Further, if switches 11 should be designed to contain an amplification factor, the input and feedback resistances of inverter 17 may have a different ohmic value relationship to each other.

Outputs of each of the bilateral switches are summed at junction 21 and coupled through a first input summing resistance 22 of weight 2R to the input of an operational amplifier 24. Analog signal $E_I$ is directly coupled to the input of operational amplifier 24 through a second input summing resistance 23 of weight 6R. A stabilizing feedback resistance 25 couples the output of amplifier 24 to the input thereof. Although resistance 25 is designated as having an ohmic value of 6R for purposes of supplying operational amplifier 24 with unity gain, the gain of amplifier 24 may be scaled, if desired, by varying the size of resistance 25.

In operation, each of flip-flop circuits 15 respectively is switched to its SET or RESET condition in accordance with whether the numeral of the digital number to be multiplied, represented by the respective flip-flop circuit 15, is a ONE or ZERO. Thus, for a positive input to any of flip-flop circuits 15, representing a ONE, a positive output signal is produced therefrom; conversely, for either a negative or zero input to any of the flip-flop circuits 15, representing a ZERO, no output signal is produced therefrom. Each output signal produced by any of flip-flop circuits 15 actuates the respective bilateral switch 11 coupled thereto which, in turn, produces voltage $E_R$, received from operational amplifier 17, as an output signal. Conversely, when no output signal is produced by any of flip-flop circuits 15, the respective bilateral switch 11 coupled thereto produces ground potential at its output. In addition, SIGN flip-flop circuit 16 actuates bilateral switch 26 coupled thereto in accordance with whether the sign of the digital input number is positive or negative; that is, a positive or ONE input signal to flip-flop circuit 16, representative of a positive digital input number, produces output voltage $E_R$ from bipolar switch 26, supplied by operational amplifier 17, while a negative or ZERO input signal to flip-flop circuit 16, representative of a negative digital input number, causes bilateral switch 26 to produce a ground potential. Thus, ladder circuit 12 receives an additional input voltage $E_R$ from switching means 10 whenever the sign of the digital number supplied to register 14 is negative.

Outputs supplied by switching means 10 to ladder circuit 12 are combined within the ladder circuit to produce an output voltage $e_0$ at junction 21. This voltage is directly proportional to a weighted total of output voltages produced by bipolar switches 11 and 26. By selecting relative ohmic values of the resistances in network 12 as previously described, output signals supplied by bilateral switch 26 carry twice the weight of output signals supplied by the adjacent or next lower bilateral switch in determining amplitude of output voltage $e_0$. Similarly, by progressing to each adjacent lower bipolar switch, output signals produced therefrom are respectively halved in weight in determining amplitude of voltage $e_0$.

Voltage $e_0$ is summed through resistance 22 with voltage $\overline{E}_R$ (which is identical to voltage $E_I$) supplied through a resistance 23, by summation amplifier 24. Thus, amplifier 24 receives, through resistance 22, the analog equivalent of digital number N wherein the amplitude of each ONE is varied or modulated in accordance with the inverse amplitude of the applied analog signal $E_I$, plus, through resistance 23, analog signal $E_I$. Accordingly, amplifier 24 produces an analog output voltage $E_0$ which is a true product of the binary number N and the analog signal $E_I$. To obtain four quadrant multiplication, the digital number supplied to register 14 is coded such that its negative is represented by a complement of the number plus a ONE.

The change in polarity of any given binary number is accompanied not only by a reversal in polarity of output voltage produced by each of the flip-flop circuits in switching means 14, thereby supplying a complement of the binary number to switching means 10, but also by a change in polarity of output voltage produced by bilateral switch 26. Since the output of switch 26, representing the most significant bit contributing to voltage $e_0$, is weighted more heavily than the combined outputs of all the other bilateral switches 11 in switching means 10, a reversal in polarity of output voltage produced by bilateral switch 26 reverses polarity of voltage $e_0$ (assuming the polarity of analog voltage $E_I$ remains the same). Thus, when a positive binary number is supplied to register 14, a ONE is supplied to flip-flop circuit 16; conversely, when the sign of the binary number is reversed, a ZERO is supplied to flip-flop circuit 16.

That four quadrant multiplication is performed by this system may be proven in the following manner. Assume that binary number N contains an arbitrary number of binary levels $n$–1, plus a sign binary level. The ordinal position of each binary digit or bit $a$ is designated by a subscript $x$ which represents each position from 1 through $n$. The significance of each bit in the makeup of voltage $e_0$ at junction 21 in network 12 decreases progressively from position 1 through position $n$. The significance of the sign bit $a_1$ in the makeup of voltage $e_0$ is double that of bit $a_2$, which in turn is double that of bit $a_3$, etc. Accordingly, the expression for voltage $e_0$ may be written $$e_0=\frac{E_R}{3}\left[a_1\frac{1}{2^0}+a_2\frac{1}{2^1}+\cdots+a_x\frac{1}{2^{(x-1)}}\right]$$
$$=\frac{E_R}{3}\sum_{x=1}^{n}a_x\frac{1}{2^{(x-1)}}$$

Output voltage $E_0$ of summation amplifier 24, assuming that the amplifier has a gain of 1, is $$E_0=-\left[\frac{\overline{E}_R}{3}+e_0\right]$$
$$=-\left[\frac{\overline{E}_R}{3}+\frac{E_R}{3}\sum_{x=1}^{n}a_x\frac{1}{2^{(x-1)}}\right]$$

where the bit in each ordinal position $a_x$ is either 1 or 0.

The above expression for $E_0$ may be rewritten $$E_0=-\left[\frac{\overline{E}_R}{3}+\frac{E_R}{3}a_1+\frac{E_R}{3}\sum_{x=2}^{n}a_x\frac{1}{2^{(x-1)}}\right]$$

where the second term of the expression represents the sign of binary number N and the portion of the third term to be summed represents the binary number N itself.

Assume that, for a positive binary number, $a_1=1$ and, for a negative binary number, $a_1=0$. Moreover, $\overline{E}_R=-E_R$. Hence, when a negative binary number is multiplied, output voltage $E_0$ may be written $$E_0=-\frac{E_R}{3}\sum_{x=2}^{n}a_x\frac{1}{2^{(x-1)}}$$
$$=-KE_RN$$

where K is a constant which can be varied, if desired, by adjusting the gain of summation amplifier 24.

Similarly, when a positive binary number is multiplied, output voltage $E_0$ may be written $$E_0=-\left[\frac{\overline{E}_R}{3}+\frac{E_R}{3}\sum_{x=2}^{n}a_x\frac{1}{2^{(x-1)}}\right]$$
$$=E_R\left[1-\sum_{x=1}^{n}a_x\frac{1}{2^{(x-1)}}\right]$$

Since, by definition, $$\overline{N}=1-N=1-\sum_{x=1}^{n}a_x\frac{1}{2^{(x-1)}}$$

then $$E_0=KE_R\overline{N}$$

By adjusting the gain of summation amplifier 24, K can be made equal to 1. Assuming that K is made equal to 1, and since $E_R=-E_I$, then, for negative binary numbers $$E_0=E_IN$$

and, for positive binary numbers $$E_0=-E_I\overline{N}$$

for the same input polarity of the analog signal. From the latter two expressions for $E_0$, it can be seen that reversal of polarity of analog signal $E_I$ reverses polarity of output voltage $E_0$.

In the event a digital number of zero is applied to register 14, all the bilateral switches 11 provide an output voltage of ground potential while bilateral switch 26 provides an output voltage $E_R$. Under these conditions, the voltage $e_0$ at junction 21 is $E_R/3$ and the voltage at the connection common to resistances 22 and 23 is accordingly zero. Hence, output voltage $E_0$ is zero.

The foregoing describes a simple, straightforward multiplier circuit capable of producing accurate four quadrant digital-analog multiplication without recourse to extraneous signal conversion operations. The circuit may also be utilized as a digital attenuator or, where interfacing between analog and digital computers is required, the multiplier of the instant invention can accomplish both the interface operation and is multiplication function simultaneously.

While only certain preferred features of the in vention have been shown by way of illustration, many modifications and changes will occur to those skilled in the art. It is, therefore, to be understood that the appended claims are intended to cover all such modifications and changes as fall within the true spirit and scope of the invention.

What is claimed is:

1. A four quadrant digital-analog multiplier comprising: register means for temporary storage of a digital signal to be multiplied by an analog signal, said register means including means responsive to polarity of said digital signal; a summation circuit for producing the product of said analog and digital signals; inverter means; means for continuously coupling said analog signal jointly to said summation circuit and said inverter means; and switching means including a plurality of individual switching units responsive to said register means for selectively coupling said inverter means to said summation circuit.

2. The four quadrant digital-analog multiplier of claim 1 wherein said summation circuit includes a network having a plurality of progressively larger attenuating means associated with respective inputs of said network, said plurality of individual switching units coupling said inverter means to individual inputs respectively of said network.

3. A four quadrant digital-analog multiplier comprising: encoding means responsive to polarity of an applied digital number for selectively producing bits, or complements of said bits plus an additional ONE bit, in accordance with said polarity; summation means; means for continuously coupling an analog signal to said summation means; and circuit means selectively coupling the inverse of said analog signal to said summation means through paths established therethrough in response to said encoding means.

4. The four quadrant digital-analog multiplier of claim 3 wherein said circuit means includes a ladder network.

5. The four quadrant digital-analog multiplier of claim 3 wherein said encoding means comprises a plurality of bistable circuits.

6. The four quadrant digital-analog multiplier of claim 5 wherein said circuit means includes a plurality of bipolar switching units responsive respectively to said plurality of bistable circuits.

7. The four quadrant digital-analog multiplier of claim 6 wherein said circuit means further includes a ladder network wherein each rung thereof is coupled respectively to each output of the bipolar switching units.

8. A system for multiplying an analog signal by a digital signal comprising: inverter means for inverting the analog signal; weighting means coupled to said inverting means and weighting the inverted analog signal in accordance with an applied digital signal; and means coupled to said weighting means for summing the weighted inverted analog signal with said analog signal to produce an output signal representing the product of said analog and digital signals.

9. The system for multiplying an analog signal by a digital signal of claim 8 including means coupled to said weighting means for furnishing an additional bit to said digital signal indicative of polarity of said digital signal.

10. The system for multiplying an analog signal by a digital signal of claim 8 wherein said weighting means includes a ladder network and said system further includes means for switching said network in accordance with the digital signal.

11. The system for multiplying an analog signal by a digital signal of claim 9 wherein said weighting means includes a ladder network and said system further includes means for switching said network in accordance with the digital signal and said added bit.

12. A circuit for multiplying an analog signal by a digital signal comprising: a summation circuit; means for coupling said analog signal to the input of said summation circuit; inverter means producing an inverted signal equal in magnitude but opposite in polarity to said analog signal; means for amplitude modulating said inverted analog signal in accordance with said digital signal; and means coupling the output of said amplitude modulating means to the input of said summation circuit, said summation circuit algebraically summing said analog signal and said amplitude modulated inverted analog signal.

13. The circuit for multiplying an analog signal by a digital signal of claim 12 wherein said amplitude modulating means includes means for modifying said inverted analog signal in accordance with magnitude of said digital signal and means for further modifying amplitude of said inverted analog signal in accordance with polarity of said digital signal.

References Cited

UNITED STATES PATENTS

| | | | |
|---|---|---|---|
| 2,966,302 | 8/1956 | Woolf et al. | 235—150.52 |
| 3,194,950 | 7/1965 | Walls et al. | 235—150.5 XR |
| 3,309,508 | 3/1967 | Witt | 235—150.52 |

MALCOLM A. MORRISON, Primary Examiner

J. F. RUGGIERO, Assistant Examiner

U.S. Cl. X.R.

235—150.5